United States Patent [19]

Cheung et al.

[11] Patent Number: 5,238,521
[45] Date of Patent: Aug. 24, 1993

[54] APPARATUS FOR ENGAGING THERMOPLASTIC STRAP IN A FRICTION-FUSION WELDING SYSTEM

[75] Inventors: Nelson Cheung, Hoffman Estates; Janusz Figiel, Mount Prospect, both of Ill.

[73] Assignee: Signode Corporation, Glenview, Ill.

[21] Appl. No.: 784,759

[22] Filed: Oct. 30, 1991

[51] Int. Cl.⁵ .................. B29C 65/06; B65B 13/32
[52] U.S. Cl. .................. 156/502; 100/33 PB; 156/73.5; 156/580; 156/581
[58] Field of Search .............. 156/73.4, 580.1, 502, 156/73.5, 580, 581; 100/33 PB

[56] References Cited

U.S. PATENT DOCUMENTS

| | | | |
|---|---|---|---|
| 3,418,185 | 12/1968 | Balamuth et al. | 156/73.4 |
| 3,442,732 | 5/1969 | Stensaker et al. | 156/73 |
| 3,445,307 | 5/1969 | Balamuth et al. | 156/73.4 |
| 3,586,572 | 6/1971 | Ericsson | 156/359 |
| 3,669,799 | 6/1972 | Vilcins et al. | 156/359 |
| 3,679,519 | 7/1972 | Frey | 156/359 |
| 3,821,048 | 6/1974 | Acker et al. | 156/73.4 |
| 3,878,015 | 4/1975 | Johnston | 156/222 |
| 3,996,403 | 12/1976 | Gould et al. | 428/198 |
| 4,050,372 | 9/1977 | Kobiella | 100/2 |
| 4,096,019 | 6/1978 | Lehmann | 156/494 |
| 4,119,449 | 10/1978 | Gould et al. | 156/73.5 |
| 4,153,499 | 5/1979 | Annis | 156/434 |
| 4,313,779 | 2/1982 | Nix | 156/361 |
| 4,490,199 | 12/1984 | Dunning | 156/73.4 |
| 4,776,905 | 10/1988 | Cheung et al. | 156/73.5 |
| 4,952,271 | 8/1990 | Cheung et al. | 156/502 |
| 5,141,591 | 8/1992 | Boek et al. | 156/502 |
| 5,169,480 | 12/1992 | Toppel et al. | 156/502 |

Primary Examiner—Jay H. Woo
Assistant Examiner—James P. Mackey
Attorney, Agent, or Firm—T. W. Buckman; D. J. Breh

[57] ABSTRACT

A movable strap-engaging member is provided for being connected at a first pivot axis to a vibrator arm for accommodating pivot movement of the vibrator arm about the pivot axis while the movable strap-engaging member is pressing a first length of flexible thermoplastic strap against a second length such strap in an elongate strap-receiving path. The movable strap-engaging member is reciprocated generally transversely of the path to effect a friction-fusion weld of the strap lengths. The movable strap-engaging member has a configuration in which first and second centers of mass are spaced apart on a line that passes through the pivot axis and that is oriented generally perpendicular to the path. The product of the square of the distance along the line between the pivot axis and the mass of the first center of mass is substantially equal to the product of the square of the distance along the line between the pivot axis and the mass of the second center of mass.

20 Claims, 1 Drawing Sheet

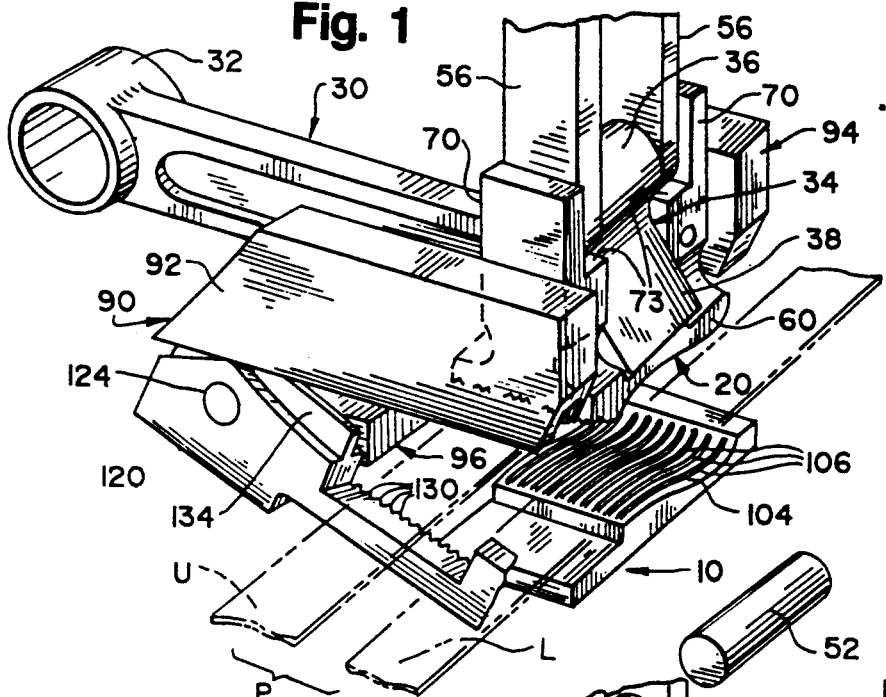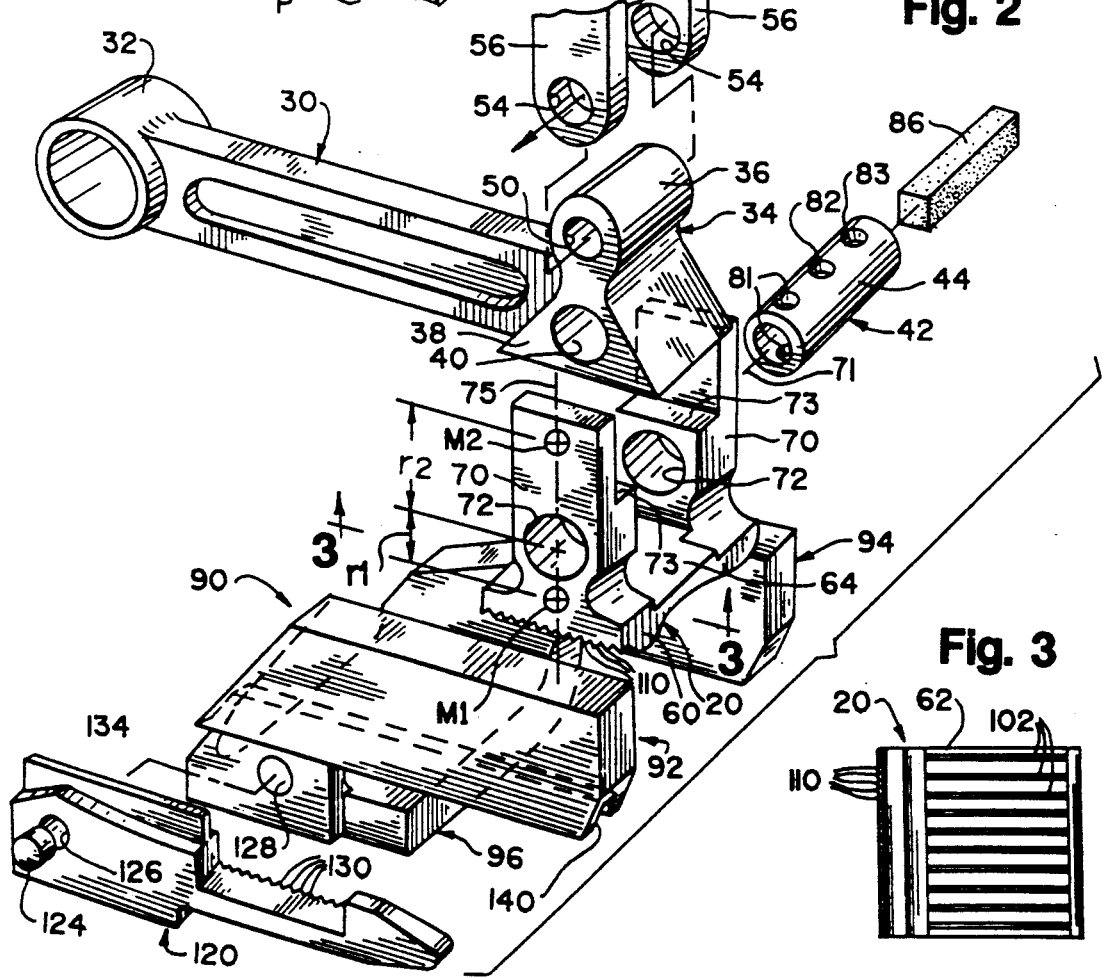

APPARATUS FOR ENGAGING THERMOPLASTIC STRAP IN A FRICTION-FUSION WELDING SYSTEM

TECHNICAL FIELD

This invention relates to an improved subassembly of components for effecting a friction-fusion weld of overlapping lengths of flexible, thermoplastic strap.

BACKGROUND OF THE INVENTION AND TECHNICAL PROBLEMS POSED BY THE PRIOR ART

The U.S. Pat. No. 4,952,271 discloses a subassembly of components for providing an improved configuration of a friction-fusion welded joint between overlapping lengths of flexible, thermoplastic strap. FIG. 3 of that patent illustrates a lower, strap-engaging member 22 which is fixed in the base of a tool frame and which engages the lower, overlapping length of strap. A movable, upper, strap-engaging member 21 is located over the upper overlapping strap length and is adapted to press the upper strap length against the lower strap length. The two strap lengths occupy an elongate, strap-receiving path between the two strap-engaging members.

The movable strap-engaging member 21 is pivotally mounted with a pin 23 to a pair of links or arms 25 which can be actuated to move the movable, strap-engaging member 21 downwardly against the straps. A vibrator arm 41 is also pivotally mounted via the pin 23 to the strap-engaging member 21. The vibrator arm 41 is driven by an eccentric shaft for effecting oscillation of the arm 41.

The movable, strap-engaging member 21 is reciprocated by the arm 41 generally transversely of the strap in the strap-receiving path. This effects a transverse reciprocating movement of the engaged, upper, strap length against, and relative to, the lower strap length which is held stationary by the lower strap-engaging member. As a result, each strap length is heated to a sufficiently plastic condition so that a part of the thickness of each strap length at the interface region fuses. Upon cooling, a substantially continuous, re-solidified thickness of each strap length is merged with the other strap length to define a welded joint.

The subassembly disclosed in the above-discussed U.S. Pat. No. 4,952,271 provides unique advantages and benefits. Although the subassembly can be incorporated in apparatus that functions satisfactorily in various operating ranges for selected component configurations and materials, it has been found that excessive component wear can occur—especially when the components have been fabricated in particular sizes from conventional, inexpensive materials and have been operated within certain parameters. This is believed to result from substantial dynamic forces imposed upon the pivot connection that is established by the pin 23 between the vibrator arm 41 and movable, strap-engaging member 21 mounted thereon.

More specifically, the strap-engaging member 21 and the vibrator arm 41 each define one or more bores for receiving the pin 23. During the oscillation of the vibrator arm 41, the dynamic forces imposed by the arm 41 on the pin 23, and imposed by the pin 23 on the movable strap-engaging member 21, can cause excessive wear of the pin 23 and of the pin-receiving bores defined in the movable strap-engaging member 21 and the vibrator arm 41.

This wear is manifested by the receiving bores becoming non-circular in axial cross-section. That is, the axial cross sections of the holes become somewhat "oblong." Similarly, the axial cross-section of the cylindrical pin 23 becomes non-circular.

The component wear results in excessive clearance or looseness in the pivot connection. Eventually, there is a significant reduction in the reciprocating motion of the movable, strap-engaging member. The lost motion may be so great that the movement of the upper strap length is insufficient to effect a proper friction-fusion weld.

For example, in one friction-fusion apparatus of the type described above, the length of the reciprocation stroke of the movable, strap-engaging member is about 1.8 millimeters. When the components are manufactured from conventional, inexpensive materials in certain sizes and operated to effect a great number of friction-fusion welds in a particular type of thermoplastic strap, the resulting wear is eventually manifested in the creation of a clearance or lost motion of about 1.4 millimeters. This leaves only about 0.4 millimeters (1.8 millimeters minus 1.4 millimeters) of actual driven movement of the movable, strap-engaging member. Generally speaking, with a relatively small, hand-held tool employing the type of friction-fusion apparatus described above, a lost motion resulting from wear of more than about 1.0 millimeters is unacceptable from the standpoint of weld quality or consistency.

When the above-discussed friction-fusion apparatus is incorporated in a hand-held tool for use with certain types of thermoplastic strapping, it is preferred that the movable, strap-engaging member be reciprocated at relatively high frequencies. Where the strap-engaging members (e.g., members 21 and 22 in the above-identified U.S. Pat. No. 4,952,271) each define a convex surface and a concave surface merging to form a flattened "Z" or "S"-shaped configuration, relatively high oscillation frequencies on the order of 333 Hertz are preferred. The inventor of the present invention has determined that the high dynamic forces created in the apparatus at these frequencies can result in above-discussed excessive component wear—at least where the components are fabricated from relatively inexpensive, conventional materials.

In view of this problem, it would be desirable to provide an improved assembly that could accommodate the relatively high operational frequencies without subjecting the apparatus components to excessive wear. Further, it would be beneficial if such an improved assembly could accommodate the use of relatively inexpensive, conventional materials for component fabrication. Also, it would advantageous if such an improved assembly could accommodate relatively simple component manufacturing techniques and relatively simply assembly procedures.

The apparatus disclosed in the above-discussed U.S. Pat. No. 4,952,271 incorporates a special design to assist in effecting the bodily sliding movement of the upper strap length relative to the overlapped, lower strap length. In particular, the movable, upper, strap-engaging member 21 includes a plurality of downwardly projecting teeth 150. Similarly, the lower strap-engaging member 22 includes a plurality of upwardly projecting teeth 150. The teeth 150 are uniformly spaced apart in rows across the width of each strap-engaging member.

The above-described tooth design may function satisfactorily in many applications. However, unless tolerances are carefully controlled, and unless steps are taken to assure precise alignment of the components, it has been found that the teeth on the strap-engaging members can become misaligned and out of registry. In particular, it is preferred that each tooth on the movable, upper, strap-engaging member be in substantial registry with a corresponding tooth on the lower, strap-engaging member (in the initially engaged, but non-reciprocating, condition) so as to effect the desired friction-fusion weld of the overlapping strap lengths.

Owing to component wear and/or manufacturing tolerances, the initially engaged position of the movable, upper, strap-engaging member 21 relative to the lower, strap-engaging member 22 may be such that the teeth of the member 21 are offset in one direction or the other along the length of the strap-receiving path. Some of the friction-fusion welds that are produced under these initial misalignment conditions may not have the desired quality (e.g., joint strength, peel resistance, etc.). It is believed that this results from inconsistent gripping of the straps during start-up of the reciprocating motion of the movable strap-engaging member. The exact mechanism responsible for variations in weld quality as a result of the above-described tooth profile misalignment is not necessarily completely understood and there is no intent herein to be bound by any theory or explanation. Nevertheless, it would be desirable to provide an improved assembly which could accommodate slight longitudinal misalignments of the strap-engaging members and which could still produce uniformly good quality welds.

The above-discussed U.S. Pat. No. 4,952,271 also discloses a pivotally mounted cutter or knife member 51 for severing the trailing portion of the strap from the upper, overlapping strap length after the weld has been formed. The lower knife member 51 cooperates with an upper knife member 47 in severing the strap. Although, the upper and lower knife system works satisfactorily in many applications, it would be desirable to provide an improved assembly that requires fewer components and that provides increased lateral rigidity for accommodating greater forces that may encountered under certain operating conditions at high strap tension loads or with straps having larger transverse cross-sections.

The present invention provides an improved assembly which can accommodate designs having the above-discussed benefits and features.

SUMMARY OF THE INVENTION

The present invention provides a novel, movable, strap-engaging member for use in effecting a friction-fusion weld of overlapping lengths of thermoplastic strap. The strap-engaging member accommodates reciprocation at frequencies on the order of 333 Hertz and greatly reduces the wear on the pivot connection between the member and a vibrator arm to which the member is mounted.

Another feature of the invention accommodates longitudinal misalignment of cooperating, strap-engaging members in a manner that more consistently produces high quality friction-fusion welds.

In addition, a further aspect of the invention provides an improved strap severing mechanism for severing the trailing portion of the strap from the welded, overlapping strap lengths.

In a preferred form of the invention, the movable, strap-engaging member is adapted to be connected at a first pivot axis to a vibrator arm for accommodating pivoting movement of the vibrator arm about the axis while the movable, strap engaging member is pressing a first length of flexible thermoplastic strap against a second length of such strap in an elongate strap-receiving path. The movable, strap-engaging member is connected to the vibrator arm so as to be reciprocated generally transversely of the path to effect a friction-fusion weld.

The movable, strap-engaging member defines first and second centers of mass which are spaced apart on a line that passes through the pivot axis and that is oriented generally perpendicular to the strap-receiving path. Further, the movable strap-engaging member has a configuration such that the product of the square of the distance along the line between the pivot axis and the mass of the first center of the mass is substantially equal to the product of the square of the distance along the line between the pivot axis and the mass of the second center of mass. It is believed that this results in a balancing of mass about the pivot axis in a way that reduces deleterious effects of the dynamic forces on the components during oscillation of the vibrator arm at high frequencies.

The improved, movable, strap-engaging member is preferably incorporated in assembly wherein a cutter blade is pivotally mounted in a frame, cage, or yoke adjacent the movable strap-engaging member. The yoke or cage provides increased lateral control of the movable, strap-engaging member and cutter blade.

In addition, in the preferred form of the present invention, the movable, strap-engaging member cooperates with a fixed, lower, strap-engaging member so that the overlapping strap lengths are pressed between the two members. Both members are provided with a novel set of outwardly projecting, spaced-apart, parallel, uninterrupted rows of gripping ridges for engaging the overlapping strap lengths, and this configuration accommodates misalignments along the strap lengths.

Numerous other advantages and features of the present invention will become readily apparent from the following detailed description of the invention, from the claims, and from the accompanying drawings.

BRIEF DESCRIPTION OF THE DRAWINGS

In the accompanying drawings that form part of the specification, and in which like numerals are employed to designate like parts throughout the same, FIG. 1 is a fragmentary, isometric view of apparatus in accordance with the teachings of the present invention at an early point in the sequence of positioning overlapping lengths of strap (shown in phantom by dashed lines) in the apparatus for being subsequently joined together with a friction-fusion weld;

FIG. 2 is an exploded, isometric view of the components shown in FIG. 1; and

FIG. 3 is a plan view taken generally along the plane 3—3 in FIG. 2 to show the strap-engaging surface of the movable, strap-engaging member.

DESCRIPTION OF THE PREFERRED EMBODIMENT

While this invention is susceptible of embodiment in many different forms, this specification and the accompanying drawings disclose only one specific form as an example of the invention. The invention is not intended to be limited to the embodiment so described, however. The scope of the invention is pointed out in the appended claims.

For ease of description, the apparatus of this invention is described in a normal (upright) operating position, and terms such as upper, lower, horizontal, etc., are used with reference to this position. It will be understood, however, that the apparatus of this invention may be manufactured, stored, transported, used, and sold in an orientation other than the position described.

Some of the figures illustrating an embodiment of the apparatus show structural details and mechanical elements that will be recognized by one skilled in the art. However, the detailed descriptions of such elements are not necessary to an understanding of the invention, and accordingly, are not herein presented.

The apparatus of the present invention is an improvement of the assembly illustrated in FIG. 3 of the U.S. Pat. No. 4,952,271. One form of the present invention may be regarded as a replacement for that assembly. Thus, one form of the present invention may be characterized as an assembly for incorporation in a tool or machine for effecting a friction fusion weld of first and second overlapping lengths of flexible, thermoplastic strap.

The preferred form of the assembly of the present invention is illustrated in FIG. 1 for use in forming a friction-fusion welded joint between a pair of overlapping, thermoplastic strap lengths: a first, or upper, strap length U and a second, or lower, strap length L. The strap lengths U and L are positioned in an overlapping relationship along or in an elongate strap-receiving path P.

The bottom of the elongate path P is generally defined by a lower, strap-engaging member or base, strap-engaging member 10. The member 10 is typically secured to the base of a tool or machine (not illustrated) which binds an article (not illustrated) with an encircling loop of strap. The strap loop around the article includes the upper overlapping strap length U and the lower overlapping strap length L. A portion of the lower strap length L is gripped (by conventional means not illustrated) so that the tool or machine can pull the upper strap length U to tension the strap loop tightly about the article.

Then, with the loop still held under tension, the overlapping strap lengths U and L are joined together by a friction-fusion weld between the lower, strap-engaging member 10 and an upper, strap-engaging member 20 as explained in detail hereinafter.

When the strap is initially encircled about the article to be bound, the overlapping strap lengths U and L are initially relatively loosely disposed over the lower, strap-engaging member 10 as illustrated in FIG. 1. To this end, other components are temporarily maintained in an initial loading/unloading position. One of the other components is the movable (or upper), strap-engaging member 20 which is shown in an elevated position spaced above the lower, strap-engaging member 10 in FIG. 1.

The movable, strap-engaging member 20 is mounted to a vibrator arm 30. The vibrator arm 30 has an end 32 that extends away from the strap-engaging member 20 and that is adapted for being mounted to an eccentric drive shaft (not illustrated) for oscillating the arm 30 and producing a generally horizontal reciprocating movement of the strap-engaging member 20. The vibrator arm end 32 may include a suitable bearing system (not illustrated) for engaging the exterior drive surface of such an eccentric drive shaft. The details of such a bearing system, of the eccentric drive shaft, and of the mechanisms for operating the eccentric drive shaft form no part of the present invention. Suitable mechanisms are shown in the U.S. Pat. No. 4,313,779.

The vibrator arm 30 includes a distal end 34 connected to the strap-engaging member 20. The distal end 34 has a rounded top portion 36 which merges with a lower, prism-shaped portion 38. The lower, prism-shaped portion 38 defines a first bore 40. The bore 40 is adapted to receive a first pivot pin 42. The pin 42 has an annular wall 44 defining a hollow, cylindrical configuration with a central passage.

The vibrator arm distal end portion 34 extends between, and is retained between, a pair of spaced apart mounting lugs 70 which extend upwardly from the movable member 20. The distal end 34 of the vibrator arm 30 is pivotally connected to the movable, strap-engaging member 20 by means of the pin 42. To this end, each lug 70 defines a bore 72 which is aligned with the vibrator arm first bore 40. The ends of the pin 42 project beyond the vibrator arm first bore 40 and extend into the strap-engaging member bores 72.

The vibrator arm distal end upper portion 36 defines a second bore 50 which is adapted to receive a pin 52 that projects on each end from the bore 50. Each projecting end of the pin 52 is adapted to be received in a bore 54 defined in the lower end of a generally vertically oriented link, arm, or pressing member 56. Two such pressing members 56 are preferably provided so that one pressing member 56 is disposed on one side of the vibrator arm 30 with the bore 54 aligned with the vibrator arm second bore 50 and so that the other pressing member 56 is disposed adjacent the other side of the vibrator arm 30 with the other bore 54 also aligned with the vibrator arm second bore 50. Each lug 70 includes an inwardly facing, stepped region or recess 73 for accommodating the lower ends of the pressing members 56.

Because the vibrator arm end 32 is pivotally mounted on an eccentric shaft (not illustrated), the arm 30 may be swung (pivoted) between the elevated position illustrated in FIG. 1 and a lowered, strap-engaging position (not illustrated) wherein the strap-engaging member 20 contacts the upwardly facing surface of the upper strap length U. This movement is effected by the links or pressing members 56 driven by suitable mechanisms and control systems. For example, the U.S. Pat. No. 4,952,271 discussed above describes pressing members (links 25 in FIG. 3 of that patent) which may be operated with suitable conventional mechanisms such as those disclosed in the U.S. Pat. No. 4,313,779. The details of such mechanisms and control systems form no part of the present invention.

The strap-engaging member 20 includes a strap-engaging pad 60 which has a downwardly facing, strap-engaging surface 62 (FIG. 3) and which has an upwardly facing surface 64 (FIG. 2). The lower strap-engaging member 10 has an upwardly facing, strap-engaging surface 104. The strap-engaging surface of each strap-engaging member 10 and 20 is adapted to contact a surface of the adjacent strap length in face-to-face contact, and the profile of each strap-engaging surface preferably has the arcuate, convex-concave configuration described in detail in the above-identified U.S. Pat. No. 4,952,271. Other configurations may be employed, including a generally flat, planar configuration.

The above-described structures for establishing the pivot connection between the pressing members 56 and arm 30, and for establishing the pivot connection between the movable, strap-engaging member 20 and the arm 30, may be generally characterized together as defining a multi-part connecting means. The pins 42 and 52 function to accommodate the pivoting movement of the vibrator arm 30 relative to the movable, strap-engaging member 20 and relative to the pressing members 56.

The pivoting movement of the arm 30 results when the arm end 32 is oscillated on the eccentric drive shaft while the arm end 34 is held down by the pressing members 56 to force the strap engaging member 20 against the upper strap length U. In a presently contemplated preferred embodiment, the arm 30 pivots about 4 degrees as the arm end 32 is oscillated on the eccentric drive shaft.

The relative pivoting movement between the vibrator arm 30 and the movable, strap-engaging member 20 occurs about a pivot axis 71 defined by the longitudinal axis of the pin 42 and bores 72, and that pivot axis 71 is oriented generally parallel to the strap length receiving path P. The relative pivoting movement between the arm 30 and the pressing members 56 occurs about a pivot axis defined by the pin 52, and that pivot axis is substantially parallel to the pivot axis defined by the pin 42.

In order to accommodate the pivoting movement of the arm 30 relative to the strap-engaging member 20, there is a small amount of clearance between the bottom of the prism-shaped portion 38 of the arm 30 and the top surface 64 of the pad 60. However, when the strap-engaging member 20 is in the elevated position (FIG. 1) to accommodate loading or unloading of the strap lengths U and L, it is desirable to ensure that the member 20 is not accidentally bumped and pivoted so that the strap-engaging surface 62 is out of alignment with the strap lengths. To this end, one of the bottom front and rear edges of the prism-shaped lower portion 38 can engage the pad upper surface 64 if the strap-engaging member 20 is pivoted more than about 4 degrees in either direction. This maintains the strap-engaging member 20 in the orientation wherein the strap-engaging surface 64 faces generally downwardly toward the strap lengths U and L.

The movable, strap-engaging member 20 is provided with a novel configuration that results in a particular distribution of its weight or mass relative to the pivot pin 42. In particular, the portion of the member 20 below the pivot axis 71 defined by the pin 42 (and by the bores 72) may be characterized as a first mass defining a center of gravity or center of mass M1. For purposes of illustration, the mass M1 is shown on the near face of the member 20 in FIG. 3. It will be realized, however, that the actual center of mass M1 of the lower portion of the member 20 is located substantially midway between the two lugs 70 below the pivot axis. That is, for ease of illustration in FIG. 2, the center of mass M1 is shown projected to the outer face of the near lug 70 (at a location that is a distance r1 below the pivot axis 71 along a line 75 which is generally perpendicular to the strap length path P and which passes through the pivot axis 71).

Similarly, the portions of the lugs 70 above the pivot axis 71 of the pin 42 have a second mass defining a second center of gravity or center of mass M2. For purposes of illustration, the center of mass M2 is shown on the outer face of the nearest lug 70 in FIG. 3. However, the actual location of the second center of mass M2 is about midway between the two lugs 70 above the pivot axis 71. However, for ease of illustration, the center of mass M2 is shown projected to the outer face of the near lug 70 (at a location that is a distance r2 above the pivot axis 71 along a line 75 which is generally perpendicular to the strap length path P and which passes through the pivot axis 71). Thus, the first center of mass M1 is located a distance r1 from the pivot axis 71 defined by the pin 42, and the second center of mass M2 is located at a distance r2 from the pivot axis 71.

The movable, strap-engaging member 20 is designed so that the centers of mass M1 and M2 lie along a line 75 (FIG. 2) that is generally perpendicular to the strap length path P and that passes through, or intersects, the pivot axis 71 defined by the pin 42. Further, the member 20 is designed so that the product of the first mass having M1 the center of mass and the square of the distance r1 along the line 75 is substantially equal to the product of the second mass having the M2 center of mass and the square of the distance r2 along the line 75.

Because the mass of the movable, strap-engaging member 20 is distributed so that the centers of mass M1 and M2 have the locations described above, the member 20 is balanced about the pivot axis defined by the pin 42 in such a way that dynamic forces imposed by the oscillating vibrator arm 30 do not cause excessive wear of the components (e.g., the pin 42, the bores 72 in the member 20, or the bore 40 in the vibrator arm 30).

Furthermore, the use of a separate pivot connection, via pin 52, between the pressing members 56 and the vibrator arm 30 allows more bearing surface to be provided between the pin 42 and the movable, strap-engaging member 20, as well as between the pin 42 and the vibrator arm bore 40. This distributes the dynamic forces over greater areas at the pivot connection between the arm 30 and the movable, strap-engaging member 20.

The pin 42 incorporates a novel design for accommodating the oscillating motion of the vibrator arm 30. In particular, annular wall 44 of the pin 42 defines three pairs of diametrically aligned bores: a first end pair of bores 81, a middle pair of bores 82, and a second end pair of bores 83. The end bores 81 are disposed within one of the bores 72 of one of the lugs 70 of the movable, strap-engaging member 20. The other end bores 83 are disposed within the other lug bore 72. The middle pair of bores 82 are disposed within the bore 40 of the vibrator arm 30. These bores permit the flow of grease from the interior of the pin 42 to the exterior of the pin 42. Grease can be provided by initially packing the central cylindrical passage of the pin 42 with a felt pad 86 which is impregnated with grease.

The movable, strap-engaging member 20 is adapted to be generally vertically aligned with the lower, strap-engaging member 10 (FIG. 1). In operation, the aligned strap-engaging member 20 is moved downwardly (by the links 56) to press the upper strap length U against the lower strap length L on top of the lower strap-engaging member 10. A novel system is provided for establishing and maintaining substantial alignment of the members 20 and 10.

In particular, a frame, cage, or yoke 90 functions to guide the movable, strap-engaging member 20. The cage 90 is mounted to a suitable portion of the strapping tool frame (not illustrated), and the cage 90 includes a pair of spaced-apart guide members 92 and 94. Each guide member 92 and 94 is unitary with a base portion 96. Each guide member 92 and 94 has an inwardly facing surface for engaging the outwardly facing surface of the adjacent lug 70. This provides a lateral guiding or restraining action and maintains the movable, strap-engaging member 20 in substantial alignment with the lower strap-engaging member 10.

Depending upon the tolerances imposed upon the manufacture of the components, the lateral guiding of the movable, strap-engaging member 20 by the cage 90 may not completely eliminate some small amount of misalignment between the strap-engaging members 20 and 10 in the longitudinal directions along the length of the strap path P. Even such a small amount of misalignment may not be desirable with some types of conventional friction-fusion tool strap-engaging members that incorporate rows of spaced-apart, individual teeth for engaging the adjacent strap length.

In some designs, such teeth are typically aligned along the lengthwise strap-receiving path P. Initially, the strap-engaging members are brought together to engage the strap lengths between them. However, if there is some longitudinal misalignment, the teeth on one strap-engaging member may be slightly offset (longitudinally) from the teeth on the other strap-engaging member prior to initiation of the reciprocation of one of the strap-engaging members. It is believed that this can result in an inconsistent or poor weld quality.

In order to minimize initial longitudinal misalignments along the strap-receiving path length, each strap-engaging member 10 and 20 is provided with a novel strap-engaging structure. In particular, the surface 62 of the movable, strap-engaging member 20 is provided with a plurality of outwardly projecting, parallel, spaced-apart, uninterrupted rows of gripper ridges 102. The lower strap-engaging member 10 has an upwardly facing surface 104 which similarly includes a plurality of outwardly projecting, spaced-apart, parallel, uninterrupted rows of gripping ridges 106.

When the overlapping strap lengths U and L are initially squeezed together—prior to oscillation of the movable, strap-engaging member 20—the ridges 102 on the member 20 are in registration with the ridges 104 on the lower member 10. This registration is assured even if the upper, movable, strap-engaging member 20 is initially, misaligned in the longitudinal direction along the length of the strap path P. The use of the registered ridges 102 and 104 is believed to provide a relatively consistent gripping action prior to, and during start up of, the oscillation of the vibrator arm 30. High quality welds are more consistently produced with such an arrangement.

The movable, strap-engaging member 20 has a trailing edge along which are provided a plurality of cutting teeth 110 (FIGS. 2 and 3). The cutting teeth 110 cooperate with a novel cutter or blade 120. In particular, the cutter 120 is pivotally mounted with a pin 124 which is received in a bore 126 at one end of the cutter 120 and which also extends into a bore 128 (FIG. 2) in the side of the yoke or cage 90. The cutter 120 includes a forwardly extending portion having a plurality of cutter teeth 130 which are adapted to coact with the teeth 110 on the movable, strap-engaging member 20.

The cutter 120 can be manually pivoted upwardly toward the guide member 92 to accommodate initial placement of the lower strap length L beneath the cutter. The cutter 120 normally swings downwardly under the influence of gravity to accommodate the upper strap length U on top of the cutter teeth 130.

A novel system is employed for providing lateral restraint of the cutter 120. In particular, the cutter 120 has an upwardly projecting wall or tab 134. The cage guide member 92 defines a downwardly open channel or groove 140 for receiving the cutter tab 134.

When the pressing members 56 are operated (by conventional or special means not illustrated) to move the strap-engaging member 20 downwardly to press against the strap lengths, the cutting teeth 110 on the strap member 20 engage the upper strap length U and force the downwardly facing surface of the upper strap length U against the upwardly projecting teeth 130 on the cutter 120. As the arm 30 is oscillated to reciprocate the strap engaging member 20 in contact with the upper strap length U, the upper strap length U is moved back and forth on the teeth 130, and the trailing portion of the strap is severed.

It will be appreciated that the novel, movable, strap-engaging member 20 and related assembly components of the present invention can be relatively easily assembled and can be operated at relatively high oscillation frequencies. Owing to the design, the dynamic forces are balanced in such a way so as to substantially minimize wear on the components.

In addition, the present invention provides novel means for effecting engagement of the overlapping strap lengths to provide a more consistent high quality weld.

Also, the assembly of the present invention incorporates unique restraining and guide systems for facilitating alignment and proper operation of the components.

It will be readily apparent from the foregoing detailed description of the invention and from the illustrations thereof that numerous variations and modifications may be effected without departing from the true spirit and scope of the novel concepts or principles of this invention.

What is claimed is:

1. An assembly for incorporation in an apparatus for effecting a friction fusion weld of first and second overlapping lengths of flexible, thermoplastic strap wherein said apparatus includes a vibrator arm having an extending portion that reciprocates generally transversely to an elongate path for receiving the strap lengths, said assembly comprising:

a pivot axis defined by said vibrator arm extending portion, said pivot axis being oriented generally parallel to said strap receiving path and intersecting a line that is generally perpendicular to said path; and a movable strap-engaging member for pressing said first strap length against said second strap length, said vibrator arm being connected to said movable strap-engaging member for pivoting movement about said axis at a location between first and second spaced-apart centers of mass of first and second masses, respectively, defined by said movable strap-engaging member on said line such that the product of the first mass and the square of the distance along said line between said pivot axis and said first center of mass is substantially equal to the product of the second mass and the square of the distance along said line between said pivot axis and the said second center of mass.

2. An assembly for incorporation in an apparatus for effecting a friction fusion weld of first and second overlapping lengths of flexible, thermoplastic strap lying in an elongate strap-receiving path and wherein said apparatus includes a base strap-engaging member, a pressing member for moving toward said base strap-engaging member, and a vibrator arm operably mounted to, and extending from, an eccentric drive means so that the extending end of the vibrator arm can be reciprocated generally transversely of said path, said assembly comprising:

a movable strap engaging member for engaging said first strap length when said overlapping strap lengths are disposed between said movable strap-engaging member and said base strap-engaging member with said second strap length disposed against said base strap-engaging member;

connecting means for connecting said vibrator arm to said movable strap-engaging member and to said pressing member for accommodating pivoting movement of said vibrator arm relative to said movable strap-engaging member about a pivot axis that is parallel to said strap-receiving path and for accommodating pivoting movement of said vibrator arm relative to said pressing member; and said movable strap-engaging member having first second centers of mass of first and second masses, respectively, lying on opposite sides of said pivot axis along a line that is generally normal to said path and that passes through said pivot axis, the product of the first mass and the square of the distance along said line between said pivot axis and said first center of mass being substantially equal to the product of the second mass and the square of the distance along said line between said pivot axis and said second center of mass.

3. The assembly in accordance with claims 1 or 2 further including a lateral guide cage defining a pair of spaced-apart guide members adapted to extend transversely across said strap-receiving path for guiding oppositely facing lateral surfaces of said movable strap-engaging member in the direction generally transversely of said path.

4. The assembly in accordance with claim 3 in which a portion of said cage defines a downwardly opening channel oriented generally transversely of said lengths of strap; and said assembly further includes a cutter pivotally mounted to said cage and having an upwardly projecting tab for being received in said cage channel to provide increased lateral restraint of said cutter.

5. The assembly in accordance with claims 1 or 2 in which said assembly further includes a cutter mounted for pivoting movement toward and away from said movable strap-engaging member.

6. The assembly in accordance with claims 1 or 2 in which said movable strap-engaging member includes a plurality of outwardly projecting, parallel, spaced-apart, uninterrupted rows of gripper ridges for engaging the top surface of said first overlapping length of strap.

7. The assembly in accordance with claim 1 in which said base strap-engaging member defines a plurality of outwardly projecting, spaced-apart, parallel, uninterrupted rows of gripping ridges for engaging the lower surface of said second length of thermoplastic strap;

said movable strap-engaging member includes a plurality of outwardly projecting, spaced-apart, parallel, uninterrupted rows of gripping ridges for engaging the upper surface of said first overlapping length of strap; and said gripping ridges on said movable strap-engaging member are generally in registry with said gripping ridges on said base strap-engaging member.

8. The assembly in accordance with claim 2 in which said connecting means includes (1) a first bore defined in said extending end of said vibrator arm, (2) a bore defined in said strap-engaging member in alignment with said vibrator arm first bore, and (3) a first connecting pin disposed in said vibrator arm first bore and in strap-engaging member bore.

9. The assembly in accordance with claim 8 in which said connecting means further includes (1) a second bore defined in said vibrator arm extending end spaced from said first bore, (2) a bore that is defined in said pressing member and that is in alignment with said vibrator arm second bore, and (3) a second connecting pin disposed in said pressing member bore and in said vibrator arm second bore.

10. The assembly in accordance with claim 8 in which said first pin has an annular wall having a hollow cylindrical configuration and defining a central cylindrical passage extending therethrough along said pivot axis;

said annular wall defines a plurality of bores extending from the exterior of the annular wall to the interior of the annular wall so as to accommodate the flow of grease between the interior of said first pin and the exterior surface of said first pin; and said assembly further includes a grease-impregnated felt pad disposed within said central cylindrical passage of said first pin.

11. The assembly in accordance with claim 1 in which said vibrator arm extending portion defines a bore;

said movable strap-engaging member defines a bore in alignment with said vibrator arm extending portion bore; and said movable strap-engaging member is connected to said vibrator arm with a pin disposed within said vibrator arm extending portion bore and within said movable strap-engaging member bore.

12. The assembly in accordance with claims 1 or 2 in which said movable strap-engaging member has a pair of spaced-apart, outwardly projecting, mounting lugs;

said vibrator arm extends between, and is retained between, said mounting lugs.

13. The assembly in accordance with claim 12 in which said movable strap-engaging member includes an upwardly facing abutment surface; and said vibrator arm includes engaging portions for engaging said abutment surface to limit the pivoting movement of said movable strap-engaging member.

14. A movable strap-engaging member adapted to be connected at a first pivot axis to a vibrator arm for accommodating pivoting movement of said vibrator arm about said pivot axis while the movable strap-engaging member is pressing a first length of flexible thermoplastic strap against a second length of such strap in an elongate strap-receiving path and for being reciprocated generally transversely to said path to effect a friction fusion weld, said movable strap-engaging member comprising:

first and second masses having first and second centers of mass respectively spaced apart on a line that passes through said pivot axis and that is oriented generally perpendicular to said path, the product of the first mass and the square of the distance along said line between said pivot axis and said first center of mass being substantially equal to the product of the second mass and the square of the distance along said line between said pivot axis and said second center of mass.

15. The movable strap-engaging member in accordance with claim 14 in which said movable strap-engaging member is connected to said vibrator arm via a pin disposed within a first bore defined within said vibrator arm and with an aligned bore defined within said movable strap-engaging member.

16. The movable strap-engaging member in accordance with claim 15 in which said pin has an annular wall which defines a hollow, cylindrical configuration and which defines a cylindrical central bore having a longitudinal axis in registry with said pivot axis.

17. The movable strap-engaging member in accordance with claim 16 in which said pin annular wall defines a plurality of passages extending from the exterior of the pin annular wall to said interior cylindrical passage for accommodating the flow of grease.

18. The movable strap-engaging member in accordance with claim 17 further including a grease-impregnated felt pad disposed within said pin central cylindrical passage.

19. The movable strap-engaging member in accordance with claim 15 in which said movable strap-engaging member is adapted to be moved downwardly against said first length of strap by a pressing member pivotally connected to said vibrator arm about a second pivot axis spaced from, and generally parallel to, said first pivot axis.

20. The movable strap-engaging member in accordance with claim 14 in which said movable strap-engaging member includes a pair of outwardly projecting, spaced-apart lugs each extending beyond said pivot axis so that said vibrating arm is disposed between said lugs.

* * * * *